(12) United States Patent
Casiez et al.

(10) Patent No.: US 6,260,798 B1
(45) Date of Patent: Jul. 17, 2001

(54) HIGH-G COMPACT FOLDING WING

(75) Inventors: Thierry Casiez, Montreal (CA); Carlos Cesnik, Watertown, MA (US); Mark Drela, Cambridge, MA (US); Staci N. Jenkins, Santa Clara, CA (US); Mark Spearing, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/425,609

(22) Filed: Oct. 22, 1999

(51) Int. Cl.$^7$ ........................................... B64C 3/38
(52) U.S. Cl. ................. 244/49; 244/3.27; 244/35 R; 244/124; 244/158 R
(58) Field of Search ................. 244/3.27, 49, 2, 244/34 R, 35 R, 39, 45 R, 123, 124, 158 R

(56) References Cited

U.S. PATENT DOCUMENTS

| | | | |
|---|---|---|---|
| 1,393,820 | * 10/1921 | Osborne | 244/2 |
| 3,065,927 | * 11/1962 | Mills | 244/2 |
| 4,296,894 | * 10/1981 | Schnabele et al. | 244/3.27 |
| 4,410,151 | * 10/1983 | Hoppner et al. | 244/3.27 |
| 4,627,585 | * 12/1986 | Einstein | 244/49 |
| 4,752,052 | * 6/1988 | Galvin | 244/3.27 |

* cited by examiner

Primary Examiner—J. Woodrow Eldred
(74) Attorney, Agent, or Firm—McDermott, Will & Emery

(57) ABSTRACT

A compact, aerodynamic wing assembly constructed and arranged so as to withstand a force due to acceleration in at least one direction includes at least two wing segments, each of the wing segments having a span-wise axis, and a airfoil cross section normal to the span axis. The wing segments are preferably disposed mutually adjacent and end to end. For each pair of wing segments, the wing further includes a pivot assembly fixedly attached to the wing segments at an end of each of the wing segments along the span-wise axis. The pivot assembly forms an articulation axis for relative movement between each the pair of wing segments, such that the wing assembly converts, upon a predetermined stimulus, from a stowed configuration characterized by nested wing segments, to a deployed configuration characterized by a substantially uninterrupted aerodynamic surface. The wing assembly is preferably constructed and arranged to withstand forces due to acceleration in at least two directions, including 15,000 g's forward and 4,000 g's rebound accelerations. The invention further comprises a flying structure constructed and arranged so as to withstand an acceleration force directed along a main axis. The flying structure includes a body disposed about the main axis, and at least one wing assembly pivotally mounted to the body. The wing assembly is constructed and arranged so as to convert, upon a predetermined stimulus, from a stowed configuration characterized by nested wing segments, to a deployed configuration characterized by a substantially uninterrupted aerodynamic surface.

31 Claims, 8 Drawing Sheets

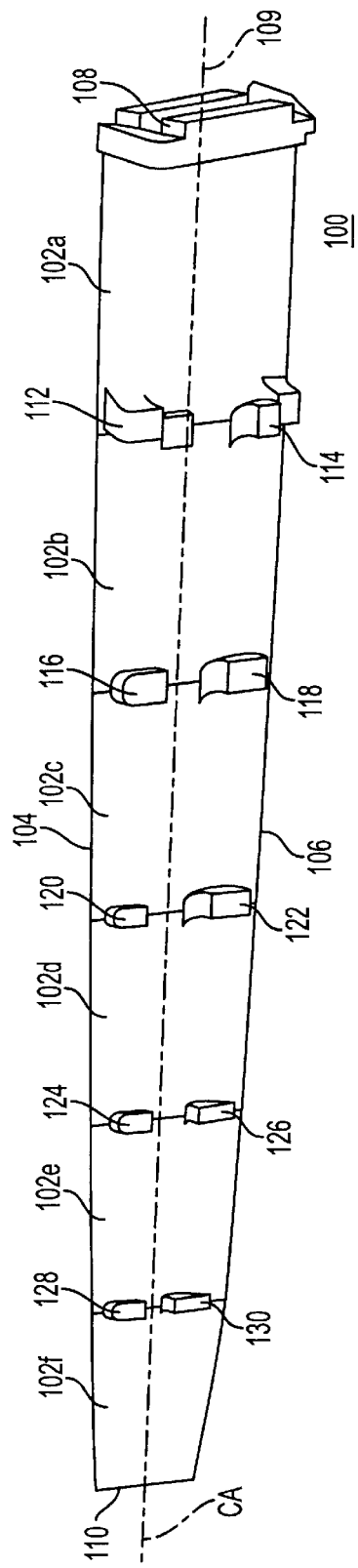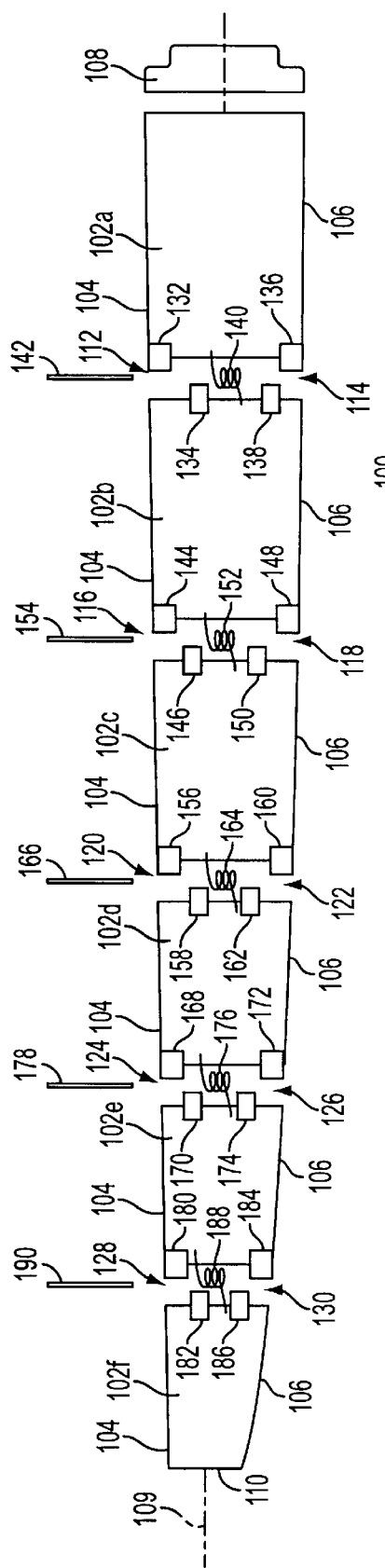
FIG. 2A
FIG. 2B

| WING SEGMENT | AREA (sq.m.×10⁻³) | ROOT CHORD (m) | TIP CHORD (m) | SPAN (m) |
|---|---|---|---|---|
| 102a | 6.581 | 0.0762 | 0.0762 | 0.0864 |
| 102b | 6.065 | 0.0762 | 0.0719 | 0.0825 |
| 102c | 4.946 | 0.0719 | 0.0652 | 0.0723 |
| 102d | 4.057 | 0.0652 | 0.0593 | 0.0653 |
| 102e | 3.365 | 0.0593 | 0.0532 | 0.0599 |
| 102f | 2.632 | 0.0532 | 0.0385 | 0.0575 |
| TOTAL | 27.646 | - | - | 0.423 |

FIG. 3

HIGH-G COMPACT FOLDING WING

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to flying structures that derive lift from associated aerodynamic surfaces, and more particularly, to such flying structures constructed and arranged so as to be deployed from a compact, stowed payload state, and withstand ballistic g-forces while in such a stowed payload state.

Reconnaissance and surveillance are universally recognized as key components of typical investigatory operations; this is especially true for military operations. Such observation tools may be used to identify and evaluate potential targets, provide targeting information to weapons platforms, and battle damage assessment following a sortie. The three general classes of observation tools currently used for reconnaissance/surveillance missions in military operation, as shown in FIG. 1, include 1) satellites, 2) high altitude/long endurance systems (e.g., JSTARS, Tier II+, U-2, etc.), and 3) tactical UAVs (e.g., Outrider, Pioneer, Hunter II, etc.). Satellites provide global coverage and high resolution information, but are typically the most expensive options and exhibit the longest response time. High altitude/long endurance systems are typically less expensive and exhibit faster response times than satellites, but provide reduce coverage (i.e., theater level rather than global). Tactical UAVs are the least expensive class of observation tools and provide the fastest response times, but provide only battlefield coverage. The cost of the observation tool is directly related to the level of command to which the tool is available. In many scenarios, it is advantageous to make an observation tool available to the lowest level of command possible. Making such tools available to lower levels of command increases battle efficiency by reducing the amount of time necessary make targeting decisions. Thus, a disadvantage to such prior art observation tools is that they are not directly available to the levels of command that could most efficiently utilize them.

Another disadvantage to such prior art observation tools is the risk involved in transporting the observation tools to a location that will provide the most valuable observation information. Because such tools often travel at sub-sonic speeds, there is a significant probability that the tool will be detected, intercepted and/or destroyed by hostile forces. One possible solution to such risk is to ballistically launch the observation tool to the desired location. However, prior art observation tools are not typically constructed to survive the high g-forces that develop during a ballistic launch. Observation tools that include aerodynamic surfaces for sustained flight are particularly vulnerable, due to the inherently fragile nature of such surfaces.

It is an object of the present invention to substantially overcome the above-identified disadvantages and drawbacks of the prior art.

SUMMARY OF THE INVENTION

The foregoing and other objects are achieved by the invention which in one aspect comprises a multi-state, aerodynamic wing assembly constructed and arranged to have a first state which is compact and adapted to withstand a substantial force due to acceleration in at least one direction, and a second state adapted for flying. The wing includes at least two airfoil sections, each of the airfoil sections having a span-wise axis, and a airfoil cross section normal to the span axis. The airfoil sections are preferably disposed mutually adjacent and end to end. The wing further includes a pivot assembly fixedly attached to each pair of adjacent ones of the airfoil sections at an end of each of the adjacent airfoil sections along said span-wise axis. The pivot assembly forms an articulation axis for angular translation of each the pair of airfoil sections, such that the wing assembly converts, upon a predetermined stimulus, from a stowed configuration characterized by nested airfoil sections, to a deployed configuration characterized by a substantially uninterrupted aerodynamic surface.

In another embodiment of the invention, the pivot assembly includes at least one hinge assembly.

In another embodiment of the invention, the pivot assembly includes at least one flex joint assembly.

In another embodiment of the invention, the pivot assembly further includes at least one actuator for forcing each pair of the airfoil sections to translate with respect to one another about the articulation axis, such that the wing assembly converts from the stowed configuration to the deployed configuration.

In another embodiment of the invention, the actuator includes a spring assembly; in particular, the spring assembly may further include a torsion spring assembly.

In another embodiment of the invention, the relative movement between each the pair of airfoil sections includes approximately 180 degrees of relative movement about the articulation axis, from the stowed configuration to the deployed configuration.

In another embodiment of the invention, at least one aerodynamic force converts the wing assembly from a stowed configuration to a deployed configuration.

In another embodiment, a combination of at least one aerodynamic force and at least one torsion spring converts the wing assembly from a stowed configuration to a deployed configuration.

In another embodiment of the invention, the wing assembly further includes at least one locking mechanism for locking the wing segments in the deployed configuration.

In another embodiment of the invention, the at least two airfoil sections includes N airfoil sections, joined by N−1 pivot assemblies and forming N−1 articulation axes, where N is an integer greater than or equal to two.

In another embodiment of the invention, the N airfoil sections includes six airfoil sections, joined by five pivot assemblies and forming five airfoil sections.

In another embodiment of the invention, the N−1 articulation axes are substantially parallel.

In another embodiment of the invention, the N−1 articulation axes are non-parallel, such that the deployed configuration includes a spiral wing.

In another embodiment of the invention, the pivot assembly further includes nesting supports, constructed and arranged such that predetermined pairs of the nesting supports are adjacent while in the stowed configuration, so as to provide structural support along the span-wise axis.

In another embodiment of the invention, the at least one direction of acceleration includes the span-wise axis.

In another embodiment of the invention, each the airfoil cross section includes a modified T16 airfoil section.

In another embodiment of the invention, each of the airfoil sections includes 7075 aluminum.

In another embodiment of the invention, each of the airfoil sections and corresponding pivot assemblies are machined from a unitary body of 7075 aluminum.

In another embodiment of the invention, each of the airfoil sections includes a composite material.

In another embodiment of the invention, each of the airfoil sections is constructed via a fabrication technique selected from the group consisting of molding, injection molding, casting, stamping and extrusion.

In another embodiment of the invention, the wing assembly is constructed and arranged so as to withstand at least one acceleration force in at least one direction.

In another embodiment of the invention, the wing assembly is constructed and arranged so as to withstand a 15,000 g forward acceleration force, and a 4,000 g rebound acceleration force.

In another aspect, the invention comprises a flying structure constructed and arranged so as to withstand an acceleration force directed along a main axis. The flying structure includes a body disposed about the main axis, and at least one wing assembly pivotally mounted to the body. The wing assembly is constructed and arranged so as to convert, upon a predetermined stimulus, from a stowed configuration characterized by nested airfoil sections, to a deployed configuration characterized by a substantially uninterrupted aerodynamic surface.

Another embodiment of the invention further includes a propulsion module disposed along the main axis adjacent to a first end of the flying structure body.

In another embodiment of the invention, the propulsion module further includes a propeller assembly, an engine assembly rotatably coupled to the propeller assembly, and a cone assembly for covering the engine assembly.

In another embodiment of the invention, the propeller assembly is constructed and arranged so as to convert, upon a predetermined stimulus, from a stowed configuration characterized by a retracted propeller, to a deployed configuration characterized by an extended propeller operative to provide thrust along the main axis upon rotation.

Another embodiment of the invention, further includes a tail module having at least one aerodynamic surface.

In another embodiment of the invention, the at least one aerodynamic surface is constructed and arranged so as to convert, upon a predetermined stimulus, from a stowed configuration characterized by a retracted aerodynamic surface, to a deployed configuration characterized by an extended aerodynamic surface.

In yet another aspect, the invention comprises a wing assembly having at least two airfoil sections, each of which extend along a span axis and between end portions thereof. Each of the airfoil sections has an airfoil cross-section normal to the span axis, and the airfoil sections are serially disposed end portion to end portion, whereby end portions of adjacent airfoil sections are mutually adjacent. The wing assembly further includes at least one pivot assembly. Each of the pivot assemblies couples the mutually adjacent end portions of a pair of the adjacent airfoil sections and defines an articulation axis about which the pair of adjacent airfoil sections are rotatable. The wing assembly is configurable in a stowed configuration state wherein the series of airfoil sections are nested with the span axes of the airfoil sections being substantially parallel. The wing assembly is further configurable in a deployed state wherein the series of airfoil sections are arranged to form a substantially uninterrupted aerodynamic surface.

In another embodiment, the span axes are substantially co-linear.

BRIEF DESCRIPTION OF DRAWINGS

The foregoing and other objects of this invention, the various features thereof, as well as the invention itself, may be more fully understood from the following description, when read together with the accompanying drawings in which:

FIG. 2A shows a perspective view of one preferred embodiment of a high-g, compact folding wing assembly;

FIG. 2B shows an exploded view of the folding wing assembly of FIG. 2A;

FIG. 3 lists, in tabular form, exemplary dimensions for the preferred embodiment of the wing segments of FIG. 2A;

DESCRIPTION OF THE PREFERRED EMBODIMENTS

Figure 1:
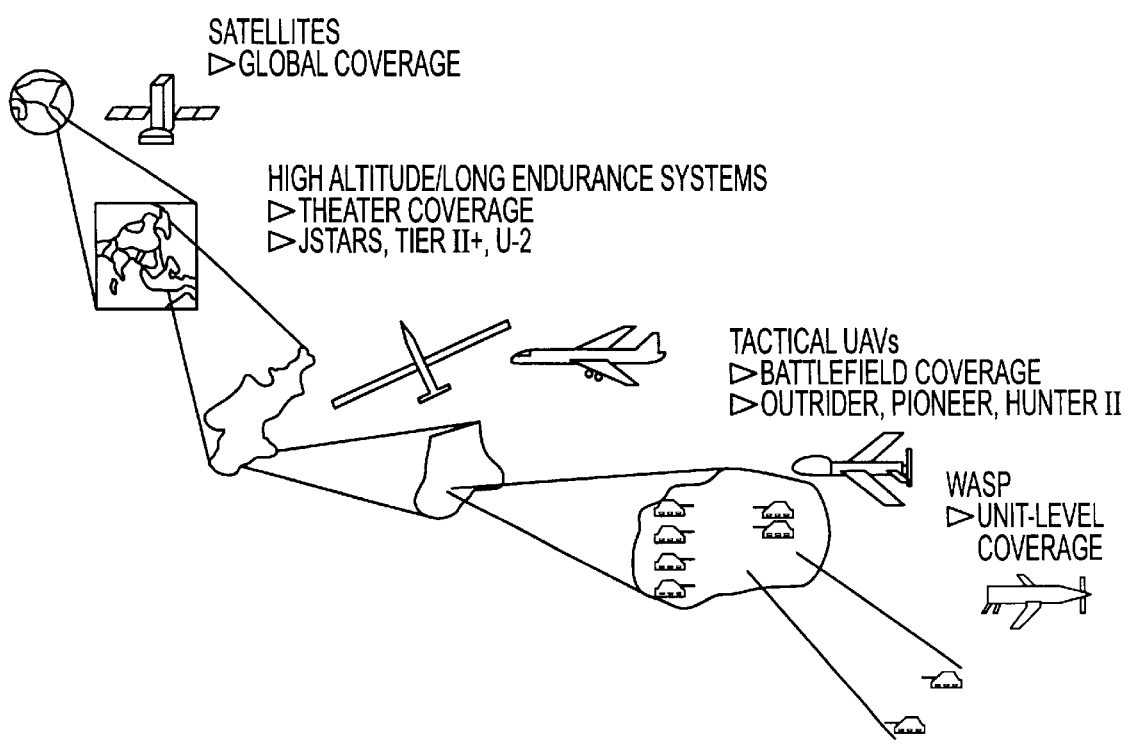
FIG. 1 shows a perspective view of three general classes of observation tools currently used for reconnaissance/surveillance missions.
Figure 4A:
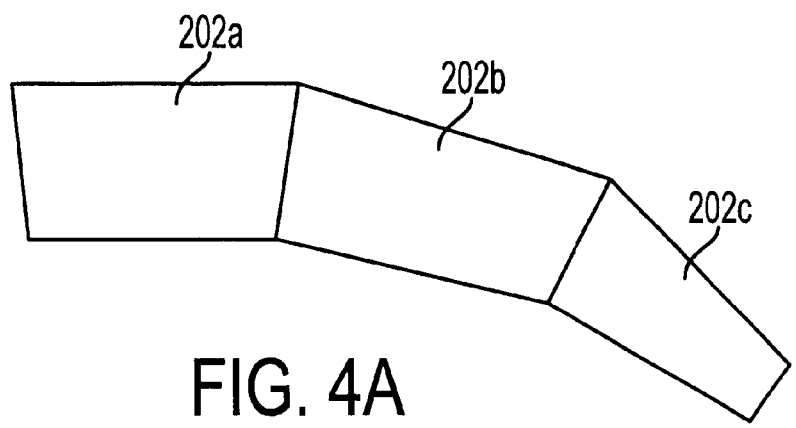
FIG. 4A illustrates a top view of a wing having three wing segments with non-parallel root edges and tip edges.
Figure 4B:
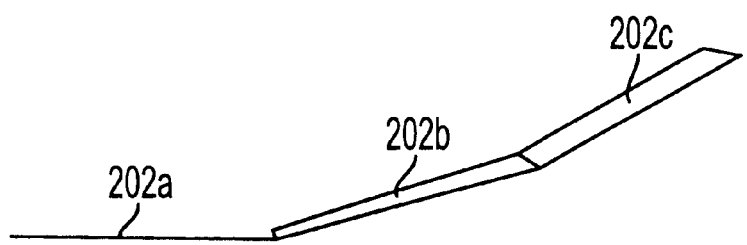
FIG. 4B illustrates a leading edge view of a wing having three wing segments with non-parallel root edges and tip edges.
Figure 4C:
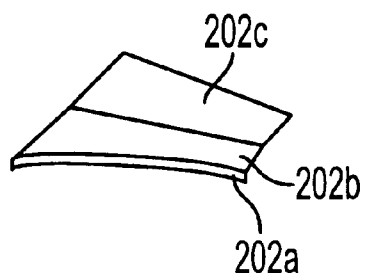
FIG. 4C illustrates a root end view of a wing having three wing segments with non-parallel root edges and tip edges.

FIG. 2A shows a perspective view of one preferred embodiment of a high-g, compact folding wing assembly 100 according to the present invention, and FIG. 2B shows an exploded view of the folding wing assembly 100 of FIG. 2A. In a preferred embodiment, the folding wing 100 includes six wing segments (also referred to as airfoil sections) 102a through 102f. The root wing segment 102a is the largest segment and is the segment that attaches to the body of an associated flying structure. The tip wing segment 102f is the smallest segment and forms the distal end of the wing 100. Exemplary dimensions for the preferred embodiment of the wing segments are listed in tabular form in FIG. 3. Each root chord length describes the linear distance from the leading edge 104 to the trailing edge 106 of the corresponding wing segment, at the root of that wing segment (i.e., the end of the wing segment closest to the wing arm 108). Each tip chord length describes the linear distance from the leading edge 104 to the trailing edge 106 of the corresponding wing segment, at the tip of that wing segment (i.e., the end of the wing segment closest to the wing tip 110). The wing arm 108 attaches to the root of the root wing segment 102a, and provides a support structure for attaching the wing 100 to the body of an associated flying structure. In a preferred embodiment, the root edges and tip edges of all wing segments are all parallel and normal to the span-wise axis 109, although in other embodiments non-parallel root edges and tip edges may be used to provide alternate wing shapes. For example, FIGS. 4A (top view), 4B (leading edge view) and 4C (root end view) illustrate a wing 200 having three wing segments 202a through 202c with non-parallel root edges and tip edges. This particular configuration gives rise to a spiral wing shape (i.e., a twist in the wing via sweeping of the edges), although other wing shapes may be formed by implementing different relative orientations of the root/tip edges.

A wing segment pivot assembly is included at the junction of each pair of wing segments. In the exemplary embodiment shown in FIGS. 2A and 2B, each wing segment pivot assembly is implemented by a pair of hinges. Other embodiments of the wing 100 may employ other pivot assembly means known to those in the art. For example, one embodiment may utilize a flex joint between each pair of wing segments. In the embodiment of FIGS. 2A and 2B, hinges 112 and 114 join wing segments 102a and 102b, hinges 116 and 118 join wing segments 102b and 102c, hinges 120 and 122 join wing segments 102c and 102d, hinges 124 and 126 join wing segments 102d and 102e, and hinges 128 and 130 join wing segments 102e and 102f. As is more clearly described in FIG. 2B, each hinge includes an outside hinge block and an inside hinge block. Each pair of hinges includes a hinge pin and a torsion spring. In particular, hinge 112 includes outside hinge block 132 and inside hinge block 134. Hinge 114 includes outside hinge block 136 and inside hinge block 138. Torsion spring 140 is situated between hinge 112 and 114, and hinge pin 142 passes through hinge blocks 132 and 134 (to form hinge 112), through torsion spring 140, and through hinge blocks 136 and 138 (to form hinge 114).

Hinge 116 includes outside hinge block 144 and inside hinge block 146. Hinge 118 includes outside hinge block 148 and inside hinge block 150. Torsion spring 152 is situated between hinge 116 and 118, and hinge pin 154 passes through hinge blocks 144 and 146 (to form hinge 116), through torsion spring 152, and through hinge blocks 148 and 150 (to form hinge 118).

Hinge 120 includes outside hinge block 156 and inside hinge block 158. Hinge 122 includes outside hinge block 160 and inside hinge block 162. Torsion spring 164 is situated between hinge 120 and 122, and hinge pin 166 passes through hinge blocks 156 and 158 (to form hinge 120), through torsion spring 164, and through hinge blocks 160 and 162 (to form hinge 122).

Hinge 124 includes outside hinge block 168 and inside hinge block 170. Hinge 126 includes outside hinge block 172 and inside hinge block 174. Torsion spring 176 is situated between hinge 124 and 126, and hinge pin 178 passes through hinge blocks 168 and 170 (to form hinge 124), through torsion spring 176, and through hinge blocks 172 and 174 (to form hinge 126).

Hinge 128 includes outside hinge block 180 and inside hinge block 182. Hinge 130 includes outside hinge block 184 and inside hinge block 186. Torsion spring 188 is situated between hinge 128 and 130, and hinge pin 190 passes through hinge blocks 180 and 182 (to form hinge 128), through torsion spring 188, and through hinge blocks 184 and 186 (to form hinge 130).

The hinges, hinge pins and torsion springs are all located on the wing intrados. The hinges allow approximately 180 degrees of rotation between the corresponding two wing segments about an articulation axis preferably collinear with the hinge pins. The motion that the hinge allows ranges from a deployed position to a stowed position, and vice versa. In the deployed position, the airfoil cross sections of the two segments are substantially parallel and are oriented in the same direction, such that the segments' extrados form a substantially continuous surface. In the stowed position, the airfoil cross sections are substantially parallel but are oriented in the opposite direction, such that the segments' intrados face one another. The embodiment of the wing 100 illustrated by FIGS. 2A and 2B employs the torsion springs 140 as actuators for converting the wing 100 from the stowed configuration to the deployed configuration. The torsion springs 140 are constructed and arranged so as to provide a torque sufficient to cause each pair of adjacent wing segments to translate with respect to one another about said articulation axis, from the stowed configuration to the deployed configuration. This torque is sufficient to maintain the wing 100 in the deployed configuration. Alternate embodiments of the invention may include other actuating mechanisms known to those in the art for converting the wing 100 from the stowed configuration to the deployed configuration, such as hydraulic actuators, pneumatic actuators, and electro-mechanical actuators, among others. Other embodiments of the present invention may not include actuators for deploying the wing, and may thus rely upon external forces to convert the wing from the stowed configuration to the deployed configuration, such as aerodynamic forces, gravity, centrifugal forces, etc. For example, one such embodiment may insert a partially deployed wing into the external air flow, and rely upon the resultant aerodynamic forces on the wing to complete the deployment and thereafter maintain the wing in the deployed configuration. Other embodiments of the invention may rely upon combinations of the various forces described herein to deploy the wing. For example, one embodiment of the invention may incorporate smaller torsion springs 140 that alone may not effect wing deployment, but rely on aerodynamic forces and/or gravity to complete deployment. An advantage to such an embodiment would be a reduction in the size of the torsion springs 140 necessary for wing deployment. Alternate embodiments of the invention may include locking mechanisms for locking the wing segments in the deployed configuration. Such locking mechanisms may be advantageous in that they also may facilitate a reduction in the size of the torsion springs (or other actuating mechanisms) necessary for deployment and maintaining the deployed configuration.

Figure 5:
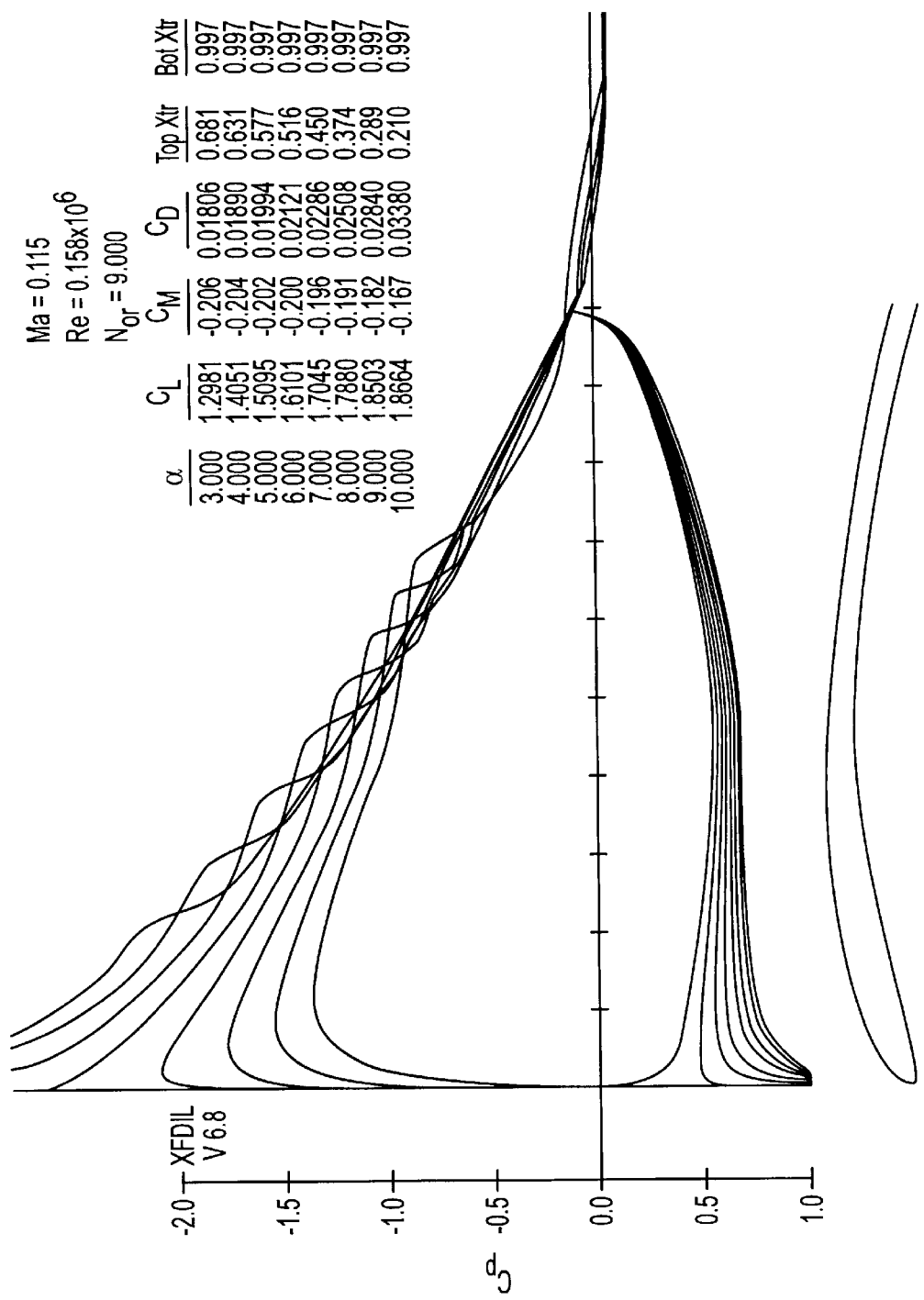
FIG. 5 shows the results of a two dimensional viscous analysis of a modified T16 airfoil section.

In a preferred embodiment, the airfoil cross section of the wing 100 is a modified version of the T16 airfoil (a typical airfoil utilized for endurance-type aircraft), although other embodiments may employ similar airfoils known to those in the art. In a preferred embodiment, the original T16 airfoil is modified by thickening the trailing edge of the airfoil to prevent buckling under acceleration along the span-wise axis 109. The results of a two dimensional viscous analysis of the modified T16 airfoil section are shown in FIG. 5. This analysis provides a graphical illustration of the pressure distributions on the modified T-16 airfoil for various angles of attack, in the flight regime expected for the wing 100. The Reynolds number used for this illustration is 158,000, derived from the mean wing average chord of 0.0647 m, a cruise flight velocity of 38.6 m/s, and a kinematic viscosity value corresponding to an altitude of 1000 m.

In a preferred embodiment of the invention, each individual wing segment 102a through 102f, including the hinge blocks, is machined from a separate body of aerospace grade aluminum (i.e., 7075 aluminum). In alternate forms of the invention, other grades of aluminum, as well as other materials suitable for aerospace applications known to those in the art, may also be used. For example, in another embodiment, the individual wing segments may consist of a composite material. Further, the individual wing segments may be fabricated by methods other than machining; for example, the wing segments may be fabricated by molding, injection molding, casting, stamping, extrusion, or combinations thereof, or by other methods known to those in the art. In other embodiments, the hinge blocks may not be integral to the wing segment as in the exemplary embodiment described herein. In another embodiment, the hinge blocks may be fabricated separately of any of the materials and via any of the fabricating methods described herein, and attached to the corresponding wing segment by means for attaching such as screws, bolts, rivets, press fit, glueing, welding, soldering, brazing, or by other means for attaching known to those skilled in the art.

Figure 6:
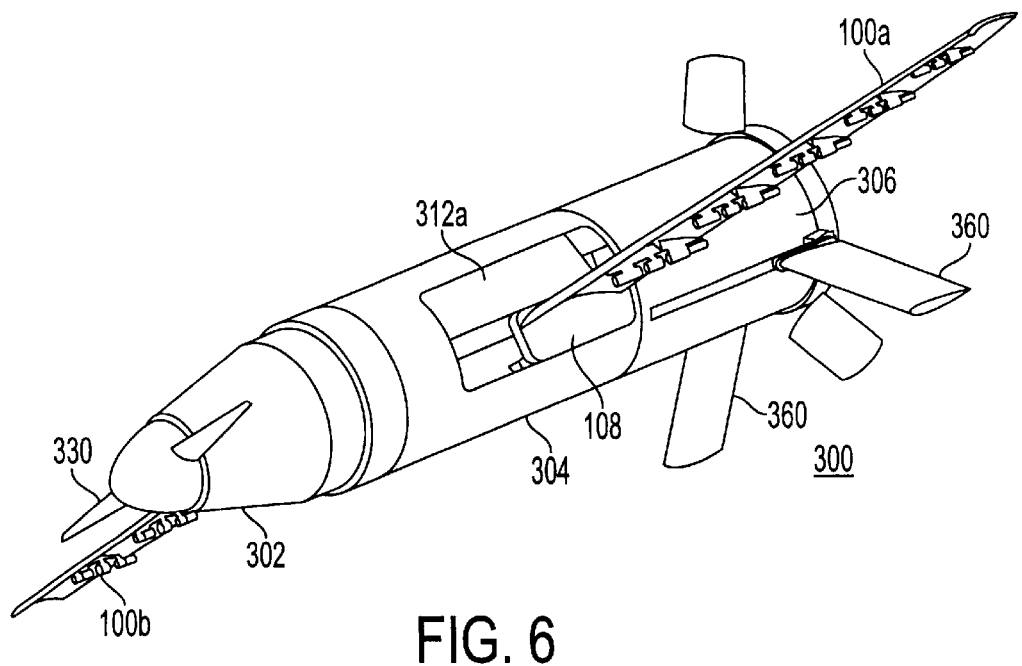
FIG. 6 shows the folding wing of FIG. 2A used in conjunction with a flying structure.

In a preferred embodiment of the invention, the wing 100 may be used in conjunction with a flying structure 300 as shown in FIG. 6. In the exemplary embodiment, the flying structure 300 includes a propulsion module 302, a wing module 304 and a tail module 306. In other embodiments, the flying structure may include one or more wings 100 attached to a central body. In these embodiments, the central body may further include a tail module, a propulsion module, various aerodynamic control surfaces, control systems, guidance systems, surveillance systems, or combinations thereof, or other aircraft components known to those in the art.

Figure 7:
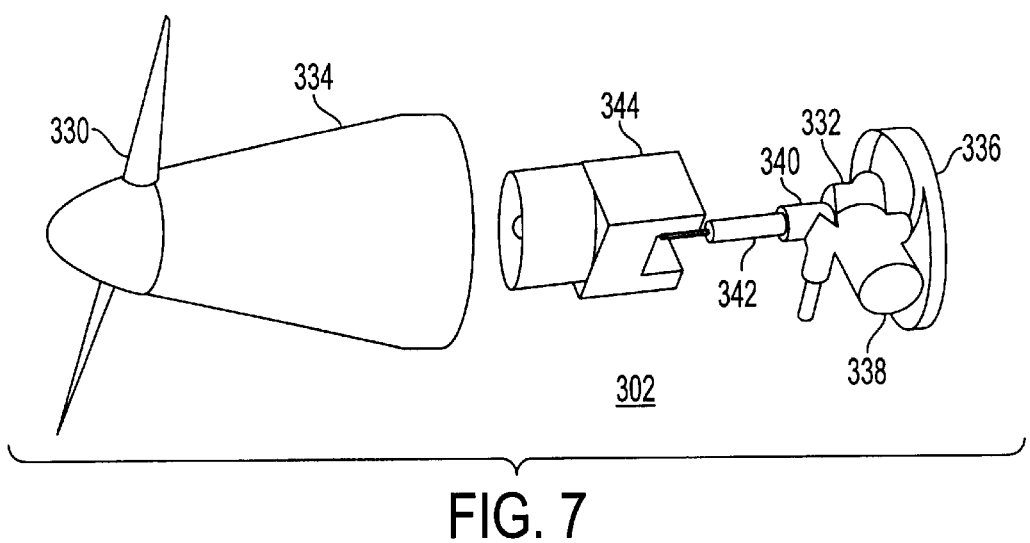
FIG. 7 shows an exploded view of the propulsion module from the flying structure of FIG. 6.
Figure 8A:
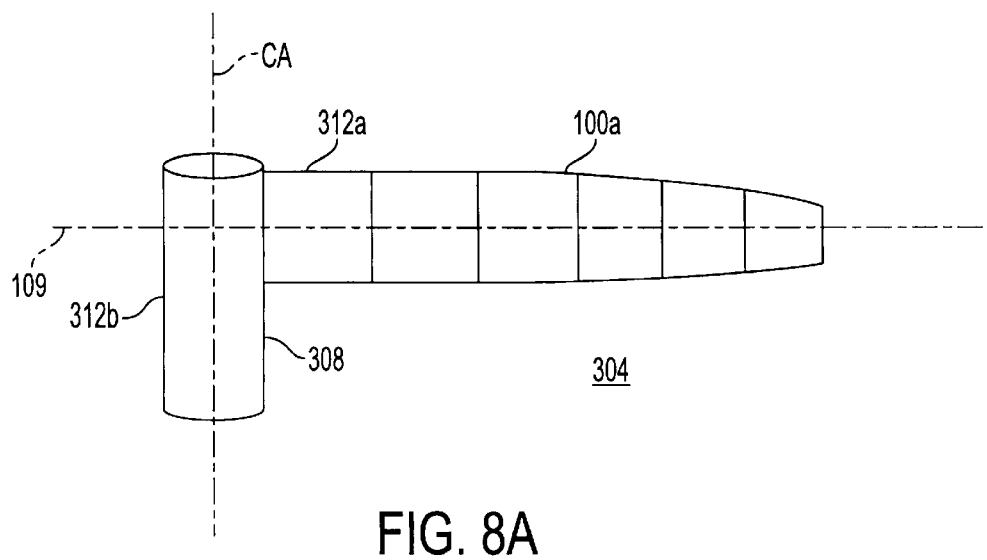
FIG. 8A shows a top view of the wing module from the flying structure of FIG. 6.
Figure 8B:
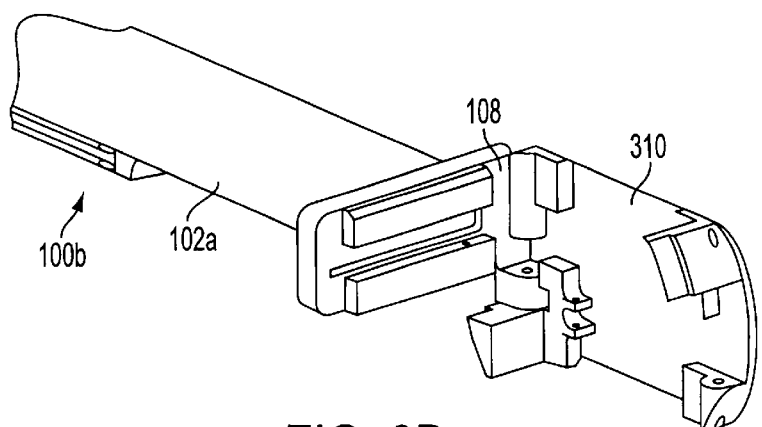
FIG. 8B shows a front perspective view of the wing arm, the back wing support and the root wing segment of a wing assembly from the wing module of FIG. 8A.
Figure 8C:
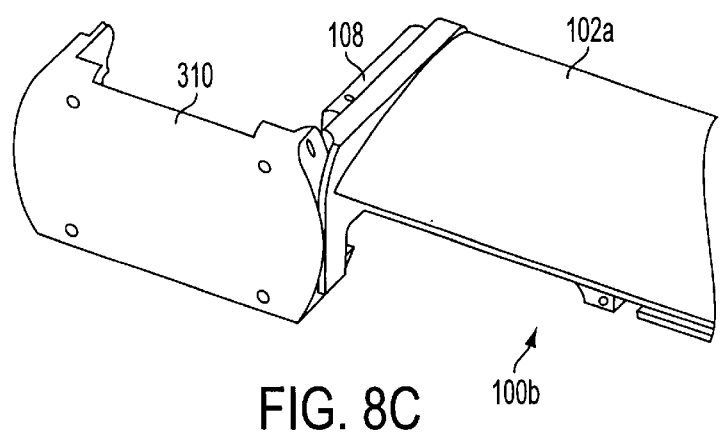
FIG. 8C shows a rear perspective view of the wing arm, the back wing support and the root wing segment of a wing assembly from the wing module of FIG. 8A.
Figure 9:
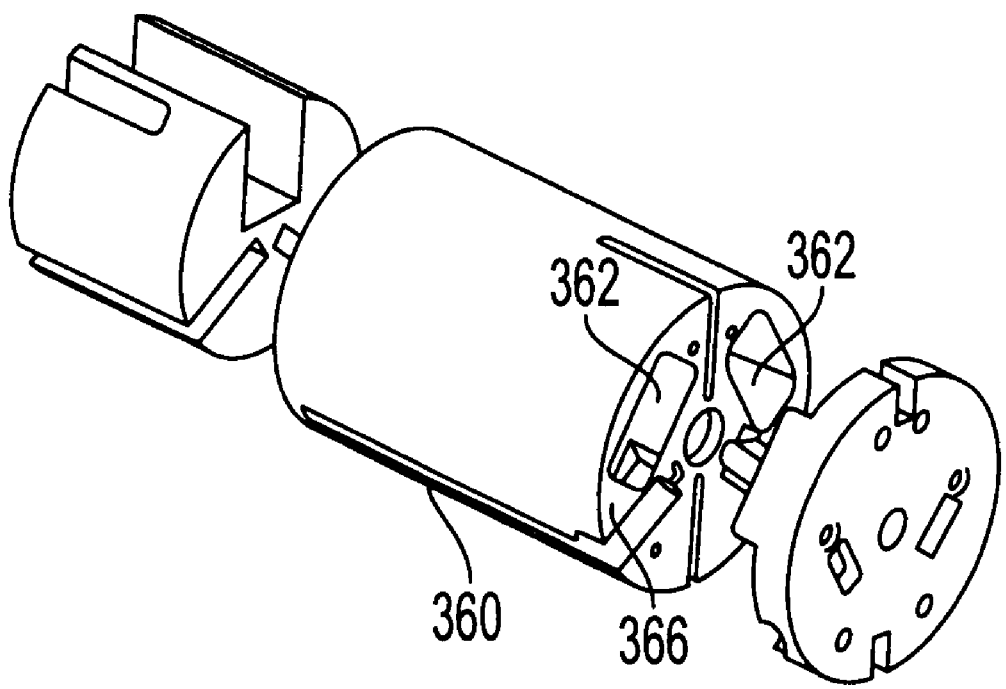
FIG. 9 illustrates an exploded view of the tail module from the flying structure of FIG. 8A.

The propulsion module 302 is shown in an exploded view in FIG. 7, the wing module 304 is shown in a top view in FIG. 8A, and the tail module 306 is shown in an exploded view in FIG. 9. The wing module 304 includes two wing assemblies 100a and 100b, although only the left wing assembly 100a is shown deployed in FIG. 8A. Each wing assembly is attached to a wing module body 308 via awing arm 108 and a back wing support 310. The wing module body 308 is preferably disposed about a central axis CA. The flying structure 300 is subjected to high-g forces during launch along this central axis CA. A front perspective view of the wing arm 108, the back wing support 310 and the root wing segment 102a of the right wing assembly 100b is shown in FIG. 8B. A rear perspective view of the wing arm 108, the back wing support 310 and the root wing segment 102a of the right wing assembly 100b are shown in FIG. 8C. When stowed, the wing assemblies 100a and 100b reside in the wing module cavities 312a and 312b, respectively. In order to free a wing from its respective wing module cavity during wing deployment, the wings execute a 90 degree rotation about a pivot point. After the 90 degree rotation, the leading edge of the wing 100 faces the flow of air.

The wings 100 pivot with respect to the wing module body 308 when the wings 100 convert from the stowed configuration (e.g., wing 100b in FIG. 8A) to the deployed configuration (e.g., wing assembly 100a in FIG. 8A). The wings 100 are more likely to survive high-g forces applied along the central axis CA due to acceleration if the span-wise axis 109 is substantially parallel to the central axis CA. Failure of the wing 100 along the span-wise axis 109 is a case of 'curved shell' buckling. Because the modified T16 airfoil section has a relatively short radius of curvature, the wing segments 102 exhibit significant resistance to buckling. The buckling characteristics of a wing stowed with the airfoil chord parallel to the central axis CA are such that the wing would not consistently survive the expected acceleration forces along the central axis CA. Acceleration loads applied parallel to the airfoil chord are transmitted through the wing configuration as a plate/column with an initial imperfection. Moreover, with the wing stowed with the airfoil chord parallel to the central axis CA the loads being applied through the thin trailing edge will create high local stresses. Thus, the wing stowed as described for the present invention (i.e., with the span-wise axis 109 substantially parallel to the central axis CA) has superior buckling characteristics with respect to a wing stowed with the airfoil chord parallel to the central axis CA.

The wing arm 108 is the junction between a pivot shaft on the back wing support 310 and the wing 100. The wing arm 108 allows the wing 100 to pivot 90 degrees with respect to the central axis CA out of the wing cavity 312. The back wing support 310 anchors the pivot shaft and is fastened at the rear end of the wing cavity 312 to the wing module 304. The acceleration loads along the central axis CA are transmitted from the wing 100, through the wing arm 108, and through the back wing support to the flyer. A torsion spring located on the pivot shaft applies torsional force to the wing arm 108 with respect to the back wing support 310. Thus, when the wing is free from any external forces, the torsion spring forces the wing 100 into the deployed configuration.

The propulsion module 302 shown in FIG. 7 includes a propeller assembly 330, an engine assembly 332, and a casing assembly 334 that covers the engine assembly and provides a low drag, uniform surface for the forward facing portion of the flying structure 300. The propulsion module further includes an engine support plate 336 for mounting the engine assembly 332 to the flying structure 300, an engine starting system 338 for initiating engine operation, a servo motor 340 for throttle control of the engine assembly 332, an extended drive shaft 342 and a universal joint 344 for rotatably connecting the engine assembly 332 to the propeller assembly 330. The propeller assembly 330 includes propeller blades, the number, shape and material of which are well known to those in the art, and a cone for aerodynamically streamlining the propeller assembly 330. The propeller blades are constructed and arranged so as to be convertible from a stowed configuration to a deployed configuration upon an external stimulus. When in the stowed configuration, the propeller blades fold back toward the axis of rotation and withdraw into cavities on the sides of the casing assembly 334. In one embodiment, the propeller blades are spring-loaded, such that the external stimulus is merely the lack of an external force maintaining the blades in the stowed position, although other means for converting the propeller blades from a stowed configuration to a deployed configuration may also be used.

The tail module 306, shown in an exploded view in FIG. 9, includes two tails 360 (only one of which is observable in FIG. 9), and two corresponding servo motors 362 for controlling the position of the tails 360. The visible tail in FIG. 9 is in its stowed configuration. Both tails may be observed in the deployed configuration in FIG. 6. The tail module 306 further includes the guidance, navigation, communication and control equipment necessary for the flying structure 300 to carry out its required mission. The tail module 306 includes slots in the tail module body 364 into which the tails 360 retract in the stowed configuration. When the tails 360 convert from the stowed configuration to the deployed configuration upon some predetermined stimulus, the tails 360 rotate 90 degrees about a tail pivot 366. In one preferred embodiment, the tail module 306 includes actuators that provide the torsional force necessary to deploy the tails 360; the actuators preferably include torsion springs located at the tail pivot 366. In other embodiments, the actuators may include other means for providing rotational motion known to those in the art. The predetermined stimulus may be merely the removal of an external force maintaining the tails in the stowed position.

In a preferred embodiment, the present invention is constructed and arranged so as to be compatible with and adapted for launch from a five-inch Navy gun, and to withstand launch forces associated with such a gun. Such launch forces typically include 15,000 g set back acceleration force and a 4,000 g set forward acceleration force, although the invention may also experience and survive other force values. Alternate embodiments of the invention may be constructed and arranged for compatibility with other launch devices and corresponding launch forces known to those in the art. As used herein, to 'withstand' the acceleration forces means to survive without degradation beyond that which would allow the invention to complete a predetermined intended mission.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are thus intended to be embraced therein.

What is claimed is:

1. A wing assembly comprising:
    at least three wing segments, each of said wing segments having a span-wise axis, and a airfoil cross section normal to said span-wise axis, said wing segments being disposed mutually adjacent and end to end;
    a wing segment pivot assembly fixedly attached to each pair of adjacent ones of said wing segments at an end of each of said adjacent wing segment along said span-wise axis;
    wherein said wing segment pivot assembly forms an articulation axis for angular translation of said adjacent wing segment pairs, such that said wing assembly converts, upon a predetermined stimulus, from a stowed configuration characterized by wing segments nested such that intrados of the segments face one another, to a deployed configuration characterized by a substantially uninterrupted aerodynamic surface.

2. A wing assembly according to claim 1, wherein said wing segment pivot assembly includes at least one hinge assembly.

3. A wing assembly according to claim 1, wherein said wing segment pivot assembly includes at least one flex joint assembly.

4. A wing assembly according to claim 1, wherein said wing segment pivot assembly further includes at least one actuator for forcing each pair of said adjacent wing segments to translate with respect to one another about said articulation axis, such that said wing assembly converts from said stowed configuration to said deployed configuration.

5. A wing assembly according to claim 4, wherein said actuator includes a spring assembly.

6. A wing assembly according to claim 4, wherein said actuator includes a torsion spring assembly.

7. A wing assembly according to claim 1, wherein said relative movement between each said pair of wing segments includes approximately 180 degrees of relative movement about said articulation axis, from said stowed configuration to said deployed configuration.

8. A wing assembly according to claim 1, wherein at least one aerodynamic force converts said wing assembly from a stowed configuration to a deployed configuration.

9. A wing assembly according to claim 1, wherein a combination of at least one aerodynamic force and at least one torsion spring converts said wing assembly from a stowed configuration to a deployed configuration.

10. A wing assembly according to claim 1, further including at least one locking mechanism for locking said wing segments in said deploy configuration.

11. A wing assembly according to claim 1, wherein said at least two wing segments includes N wing segments, joined by N−1 pivot assemblies and forming N−1 articulation axes.

12. A wing assembly according to claim 11, wherein said N wing segments includes six wing segments, joined by five pivot assemblies and forming five articulation axes.

13. A wing assembly according to claim 11, wherein said N−1 articulation axes are substantially parallel.

14. A wing assembly according to claim 11, wherein said N−1 articulation axes are non-parallel, such that said deployed configuration includes a spiral wing.

15. A wing assembly according to claim 1, said pivot assembly further including nesting supports, constructed and arranged such that predetermined pairs of said nesting supports are adjacent while in said stowed configuration, so as to provide structural support along said span-wise axis.

16. A wing assembly according to claim 1, wherein said at least one direction includes said span-wise axis.

17. A wing assembly according to claim 1, wherein each said airfoil cross section includes an airfoil section having a thickened trailing edge.

18. A wing assembly according to claim 1, wherein each of said wing segments includes an aluminum alloy.

19. A wing assembly according to claim 1, wherein each of said wing segments and corresponding pivot assemblies are machined from a unitary body of an aluminum alloy.

20. A wing assembly according to claim 1, wherein each of said wing segments includes a composite material.

21. A wing assembly according to claim 1, wherein each of said wing segments is constructed via a fabrication technique selected from the group consisting of molding, injection molding, casting, stamping and extrusion.

22. A wing assembly according to claim 1, constructed and arranged so as to withstand at least one acceleration force in at least one direction.

23. A wing assembly according to claim 22, constructed and arranged so as to withstand a 15,000 g forward acceleration force, and a 4,000 g rebound acceleration force.

24. A flying structure constructed and arranged so as to withstand an acceleration force directed along a main axis, comprising:
    a flying structure body disposed about said main axis; and,
    at least one wing assembly pivotally mounted to said flying structure body, said wing assembly constructed and arranged so as to convert, upon a predetermined stimulus, from a stowed configuration characterized by nested wing segments, to a deployed configuration characterized by a substantially uninterrupted aerodynamic surface;

wherein said stowed configuration is further characterized by a span-wise axis of each of said wing segments being substantially parallel to said main axis.

25. A flying structure according to claim 24, further including a propulsion module disposed along said main axis adjacent to a first end of said flying structure body.

26. A flying structure according to claim 25, wherein said propulsion module further includes a propeller assembly, an engine assembly rotatably coupled to said propeller assembly, and a casing assembly for covering said engine assembly.

27. A flying structure according to claim 26, wherein said propeller assembly is constructed and arranged so as to convert, upon a predetermined stimulus, from a stowed configuration characterized by a retracted propeller, to a deployed configuration characterized by an extended propeller operative to provide thrust along said main axis upon rotation.

28. A flying structure according to claim 24, further including a tail module having at least one aerodynamic surface.

29. A flying structure according to claim 24, wherein said at least one aerodynamic surface is constructed and arranged so as to convert, upon a predetermined stimulus, from a stowed configuration characterized by a retracted aerodynamic surface, to a deployed configuration characterized by an extended aerodynamic surface.

30. A wing assembly comprising:
  A. at least three wing segments, each of said wing segments extending along a span axis and between end portions thereof, and having an airfoil cross-section normal to said span axis, said wing segments being serially disposed end portion to end portion, whereby end portions of adjacent wing segments are mutually adjacent,
  B. at least one pivot assembly, each of said pivot assemblies coupling said mutually adjacent end portions of a pair of said adjacent wing segments and defining an articulation axis about which said pair of adjacent wing segments are rotatable, whereby said wing assembly is configurable in a stowed state wherein said series of wing segments are nested such that intrados of the segments face one another, with said span axes of said wing segments being substantially parallel, and a deployed state wherein said series of wing segments are arranged to form a substantially uninterrupted aerodynamic surface.

31. A wing assembly according to claim 30, wherein said span axes are substantially co-linear.

* * * * *